United States Patent [19]

Denham

[11] 4,446,760

[45] May 8, 1984

[54] SAW BLADE CLAMP

[76] Inventor: Daniel W. Denham, 806 Ann, Independence, Mo. 64056

[21] Appl. No.: 402,591

[22] Filed: Jul. 28, 1982

[51] Int. Cl.³ .......................................... B23D 61/10
[52] U.S. Cl. .................................................. 76/79
[58] Field of Search ................. 76/78 R, 78 A, 37, 79

[56] References Cited

U.S. PATENT DOCUMENTS

| | | |
|---|---|---|
| 333,092 | 12/1885 | Winkler . |
| 573,737 | 12/1896 | West et al. ......................... 76/78 R |
| 985,209 | 2/1911 | Russell . |
| 997,243 | 7/1911 | Daley ................................. 76/78 R |
| 2,130,076 | 9/1938 | Dominiak . |
| 2,657,594 | 11/1955 | Frazier . |
| 2,707,888 | 5/1955 | Willard . |
| 2,770,152 | 11/1956 | Davis . |
| 3,451,292 | 6/1969 | Goode ................................. 76/78 R |
| 3,526,157 | 9/1970 | Rachal . |
| 3,903,760 | 9/1975 | Jones . |

FOREIGN PATENT DOCUMENTS 126636 11/1949 Sweden ............................... 76/78 R Primary Examiner—Roscoe V. Parker
Attorney, Agent, or Firm—Litman, Day & McMahon

[57] ABSTRACT

A clamp for releasably securing a circular saw blade with a central opening to a support having an opening. The clamp includes a spindle provided with a body for engaging the saw blade within its opening and a shank for extending through the support opening and receiving a nut for drawing the spindle body rearwardly toward the support whereby the blade is rotatably retained thereagainst. A plurality of levers having proximate and distal ends extend radially outwardly from the spindle body and are pivotally attached thereto at fulcrums between the lever ends. A spring engages the spindle body and is connected to the lever proximate ends for biasing them forwardly whereby the lever distal ends are biased rearwardly and clamp the saw blade against the support. A quick-release feature is provided for unclamping the saw blade.

19 Claims, 3 Drawing Figures

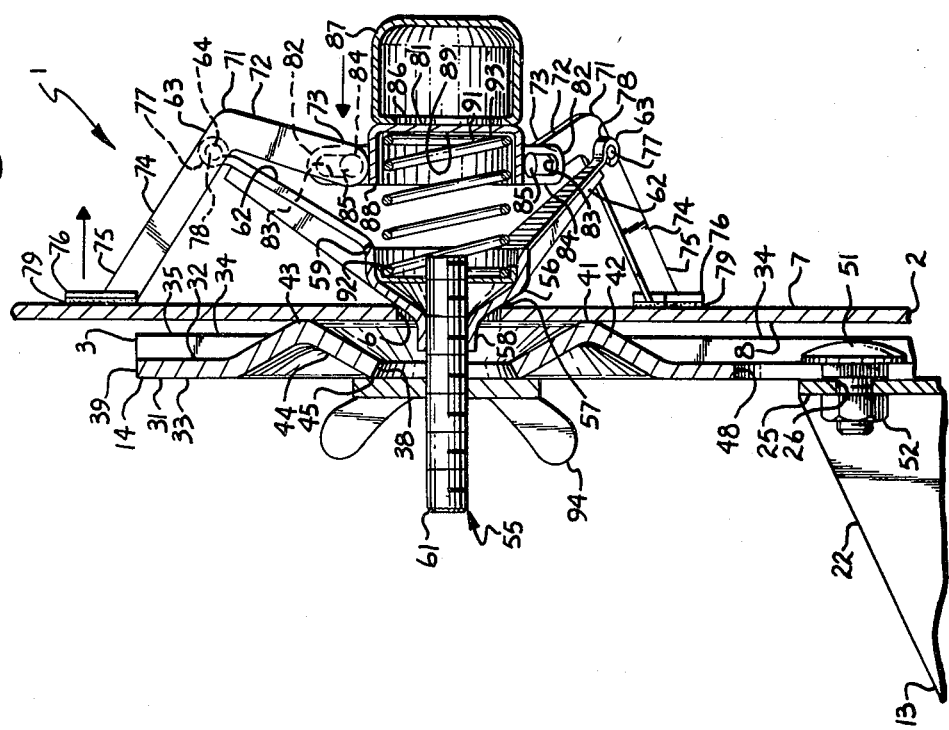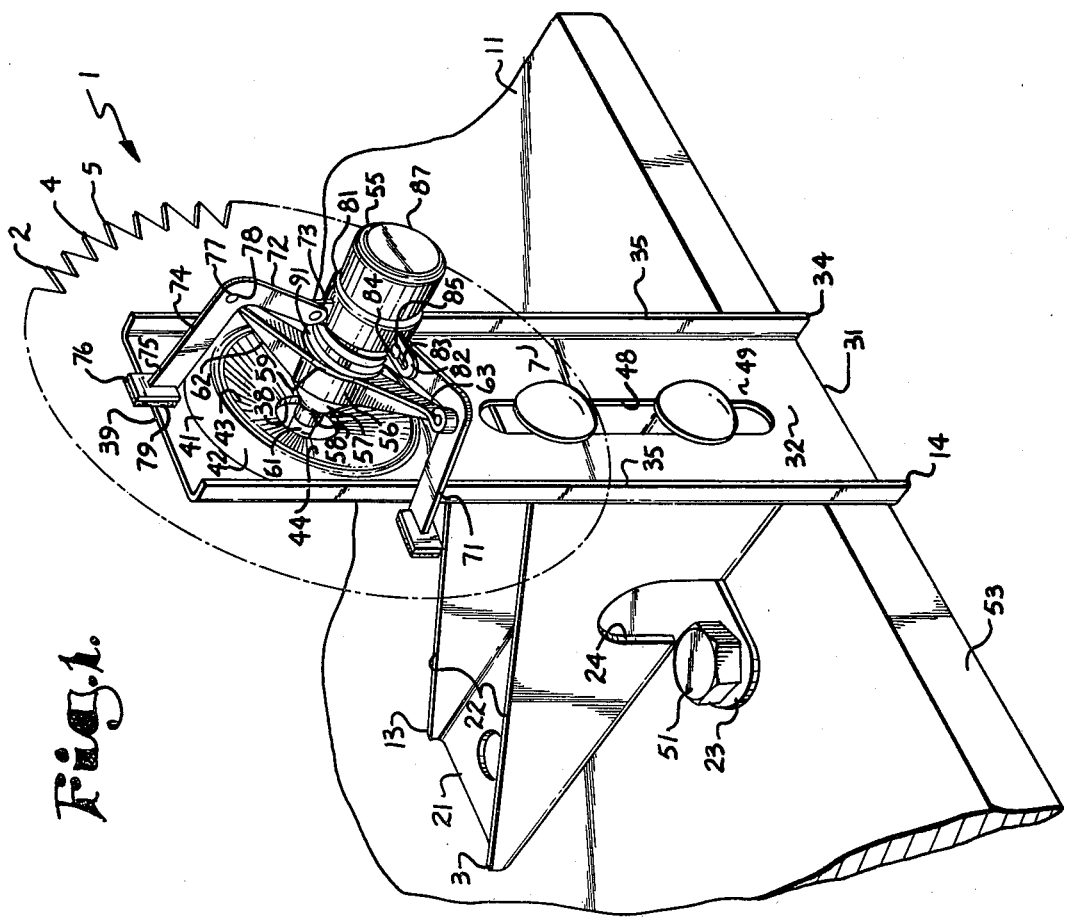

SAW BLADE CLAMP

BACKGROUND OF THE INVENTION

1. Field of the Invention

The present invention relates to sharpening devices, and in particular to a device for clamping a circular saw blade for sharpening.

2. Description of the Prior Art

In order to maximize the usage of circular saw blades, the cutting edges of their teeth must be periodically resharpened. For proper cutting, each tooth should have the same clearance, hook angle, slope from front to back, rake, and height. Circular saw blades with teeth having excessive variance among these characteristics, even though sharp, tend to leave jagged kerfs, draw to one side or the other, cut unevenly and may even be dangerous to a user.

Although specialized machinery has been devised for grinding saw blades to precise specifications, for example at their place of manufacture, such equipment is relatively complex and expensive and thus impractical for the worker desirous of sharpening only a relatively small quantity of saw blades. For example, many workers find it expedient to sharpen their own saw blades and possibly those of a crew with which they work. Although not as accurate as specialized machine tools, hand tools such as ordinary files can give satisfactory results, particularly where a saw blade merely requires "touching up".

A common problem encountered in sharpening saw blades by hand lies in the necessity of securely clamping the blade in a fixed position so that accurate sharpening can be accomplished manually. A relatively simple method of clamping a saw blade for sharpening involves placing it in an ordinary vice with opposing jaws which are threadably drawn together against opposite sides of the blade. The prior art is replete with other clamping devices utilizing screw-type actuators. For example, both the Winkler Pat. No. 333,092 and the Dominiak Pat. No. 2,130,076 patents show devices with a pair of jaws for threadably clamping against a circular saw blade.

In a typical manual sharpening operation, a circular saw blade is rotated nearly 360 degrees throughout the operation so that the teeth to be sharpened are facing in a desired direction for convenient access thereto. Ideally the saw blade would be rotated as each tooth was sharpened a distance equal to the circumferential spacing of the teeth whereby each would be in exactly the same position relative to the operator when sharpened. However, clamping devices with jaws which are threadably drawn together, such as many of those shown in the prior art, consume relatively large amounts of time in merely tightening and untightening motions. For the sake of expediency when using such threadably actuated clamping devices, the saw blade is often left in the same position while a number of teeth are sharpened. The results generally suffer somewhat when this procedure is followed because the file orientation varies from tooth to tooth and hence the shapes to which the teeth are manually filed tend to be somewhat inconsistent.

A second disadvantage with not rotating the saw blade each time a different tooth is filed is that whatever light source is employed for the operation will cause sutble differences in the appearance of saw teeth with different orientations. The operator is thus hampered in visually guaging the configuration to which each tooth is filed for purposes of maintaining consistency.

To relieve the tediousness associated with tightening and untightening a screw-type mechanism each time the saw blade is rotated, saw blade clamps have been devised which employ springs for urging the jaws of a clamp together. Such devices are exemplified by the Russel Pat. No. 985,209 and Willard Pat. No. 2,707,888 patents. However, both of these mechanisms utilize levers which must be manually engaged and pivoted to release positions before the blade can be rotated. Even though preferable to threadably actuated clamps, these structures tended to delay an operator in releasing the clamp.

SUMMARY OF THE INVENTION

In the practice of the present invention, a clamp is provided for releasably securing a circular saw blade having a plurality of circumferentially spaced teeth and a central opening to a support having front and rear faces and an opening extending therebetween. The clamp includes a spindle with a body having a frusto-conical portion for engaging the saw blade within the opening thereof, a threaded shank extending coaxially and rearwardly from the spindle body, and a plurality of arms extending radially and forwardly from the spindle body. A nut is threadably received on the shank for retaining the spindle in the saw blade and support openings whereby the spindle body rotatably retains the saw blade against the support. A plurality of levers are each pivotally connected to a respective arm at a fulcrum positioned between a proximate and a distal end of the lever. Each lever distal end displays a foot adapted for engaging the saw blade and clamping it in antirotational contact against the support.

A helical spring includes a rear end engaging the spindle body and a front end engaging a spring retainer cap. The spring retainer cap is pivotally connected to each lever proximate end. The spring normally biases the spring retainer cap forwardly away from the spindle body whereby the lever feet are urged against the saw blade. The spring retainer cap is movable, as by engagement by an operator, rearwardly toward the spindle body for releasing the lever feet whereby the saw blade may be rotated.

The principal objects of the present invention are: to provide a clamp for retaining a circular saw blade for sharpening; to provide such a clamp with a spring for effecting a clamping engagement on the saw blade; to provide such a clamp with a quick-release feature for expeditiously rotating the saw blade; to provide such a clamp which facilitates rotating the saw blade for each saw tooth to be filed; to provide such a clamp which facilitates accurate and consistent filing of each saw tooth; to provide such a clamp with a spring retainer cap engageable by an operator's knee for releasing the saw blade for rotation; to provide such a clamp which is actuated by alternatively pushing and releasing a spring retainer cap; to provide such a clamp with a support and a mounting bracket adapted for securing it to a variety of structures; to provide such a clamp which facilitates rapidly sharpening circular saw blades by hand; to provide such a clamp which is adapted to accommodate a variety of circular saw blades having different diameters and teeth configurations; to provide such a clamp which is economical to manufacture, efficient in use, capable of a long operating life and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a saw blade clamp embodying the present invention.

FIG. 2 is an enlarged, fragmentary vertical cross-sectional view of the saw blade clamp.

DESCRIPTION OF THE PREFERRED EMBODIMENT

Figure 3:
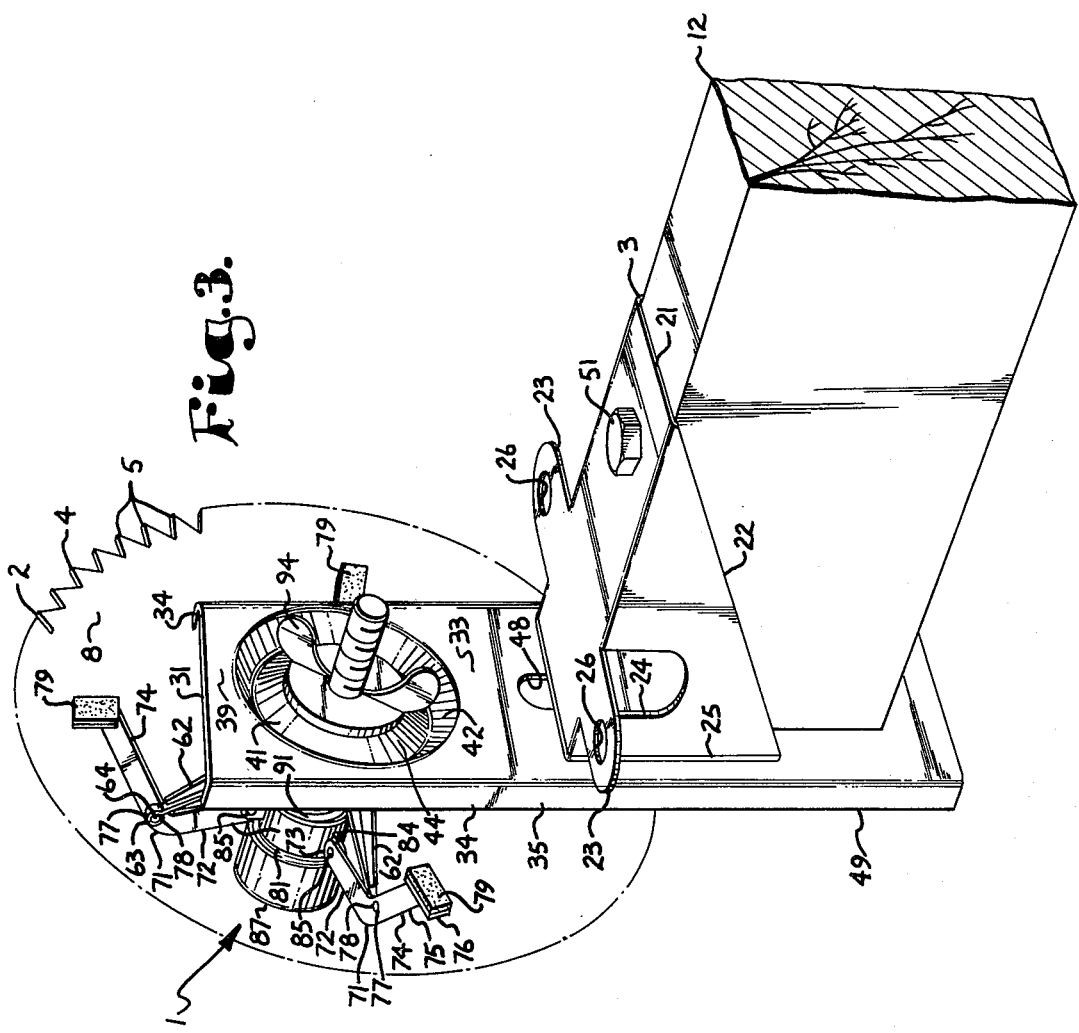
FIG. 3 is a perspective view of the saw blade clamp showing an alternative mounting thereof on an elongated structural member.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "front" and "rear" and derivatives thereof shall relate to the directions to the right and left respectively of the invention as oriented in FIG. 2. However, it is to be understood that the invention may assume various alternative orientations, except where expressly specified to the contrary.

Referring to the drawings in more detail, the reference numeral 1 generally indicates a clamp for releasably securing a saw blade 2 to a support 3. The saw blade 2 as shown has a generally circular configuration with a plurality of circumferentially spaced, radially extending teeth 4 with respective cutting edges 5. A concentric, central opening 6 extends between front and rear opposite faces 7 and 8 respectively of the saw blade 2.

The circular saw blade 2 is of the type used in various power saws which are adapted for imparting a rotary motion to the saw blade 2 about its rotary axis which extends through the opening 6 in a direction substantially normal to the faces 7 and 8. In use, the cutting edges 5 are thus brought into cutting engagement with a work piece in rapid succession. Such saw mechanisms may comprise, for example, circular saws, table saws, radial arm saws, power miter saws and the like. The saw blade 2 is typically mounted on such power saws by a mounting bolt or stud extending through the saw blade opening 6. Although a round opening 6 is shown, diamond shaped saw blade openings are known which are adapted to provide a more positive, anti-slip connection with a respective saw mechanism. The clamp 1 of the present invention is adapted to retain circular saw blades having either type of central opening.

The support 3 comprises a novel arrangement for conveniently positioning the saw blade 2 for sharpening on a variety of base structures such as a work table 11 with a substantially planar surface (FIG. 1) or an elongated member 12 comprising, for example, a wooden framing member (FIG. 3). The support 3 generally comprises a brace 13 with an upright 14 mounted thereon. Preferably, the brace 13 comprises an integral piece of sheet metal stamped and formed into the desired configuration using conventional techniques. A horizontal base plate 21 is provided with a pair of opposite side walls 22 extending therefrom and having configurations substantially defining right triangles. Preferably, about one and one-half inches clearance is provided between the side walls 22 whereby common wooden framing members such as that shown at 12 having nominal thicknesses of two inches and actual thicknesses of approximately one and one-half inches may be snugly received therebetween.

A pair of ears 23 extend outwardly from the opposite side walls 22 in coplanar relation with the base plate 21. The ears 23 are stamped from the side walls 22 when the brace 13 is formed and leave cut-outs 24 therein. An end wall 25 is integrally connected to the base plate 21, extends at a right angle therefrom and is attached to the side walls 22. The brace 13 has a plurality of apertures 26 therethrough in the base plate 21, ears 23 and end wall 25.

The upright 14 generally comprises a channel with a web 31 having front and rear faces 32 and 33 respectively and a pair of opposite flanges 34 extending forwardly from the web front face 32 and terminating at front edges 35. A support opening 38 extends through the web 31 midway between the flanges 34 at an upper portion 39 of the upright 14.

Annularly surrounding and coaxial with the stud opening 38 is a spacer 41 with a fowardly extending frusto-conical portion 42 terminating at a spacer front edge 43 in spaced relation forward of the flange front edges 35 and a rearwardly extending frusto-conical portion 44 terminating at a spacer rear edge 45. The forwardly extending frusto-conical space portion 42 annularly surrounds and is concentric with the rearwardly extending frusto-conical spacer portion 44. An elongated slot 48 extends through the web 31 from its upper portion 39 to a lower portion 49 in alignment with the upright 14 and midway between the flanges 34.

In operation, the support 3 is assembled by inserting suitable fasteners such as bolts and nuts 51 and 52 respectively through the apertures 26 in the end wall 25 and the elongated slot 48, which allows for vertical adjustment of the position of the upright 14 relative to the brace 13. The brace 13 may then be attached to a horizontal base such as the work table 11 by bolts 51 extending through apertures 26 in the base plate 21 and ears 23. The upright 14 is thus positioned immediately in front of an edge 53 of the work table 11.

An alternative mounting for the support 3 is shown in FIG. 3 wherein the brace 13 is inverted with its base plate 21 on top. The longitudinal framing member 12 is received between the side walls 22. The brace 13 is secured to the member 12 by bolts 51 positioned in an aperture 26 of its base plate 21.

The clamp 1 includes a spindle 55 having a body 56 with a frusto-conical portion 57 extending between a body rear apex end 58 and a front base end 59. A threaded shank 61 is secured to the body 56 in a fixed, crimped engagement with its rear apex end 58 and extends coaxially and rearwardly therefrom.

At the body front base end 59 a plurality of arms 62 are circumferentially spaced and extend radially and forwardly from the body 56. Each arm 62 terminates at a distal end 63 having a respective receiver 64 extending transversely therethrough.

A plurality of levers 71 each having a first leg 72 terminating at a proximate end 73 and a second leg 74 terminating at a distal end 75 forming a foot 76 are associated with respective spindle arms 62. Attached to each foot 76 on the rearward side thereof is a respective anti-slip pad 79 comprising, for example, a suitable elastomeric material. As shown in FIG. 2, the legs 72 and 74 of each lever 71 are angularly displaced with respect to each other whereby the first legs 72 extend in an outward and forward direction from the spindle body 56 and the second legs 74 extend outwardly and rearwardly from the second legs 74. In proximity to the intersections of associated legs 72 and 74, fulcrums 77 are formed whereat the levers 71 are pivotally attached to respective arm distal ends 63 by pivot pins 78 positioned in respective receivers 64.

A spring retainer cap 81 is positioned coaxially with the spindle 55 and has a plurality of circumferentially spaced ears 82 extending radially outwardly therefrom and each having an elongated slot 83. Each first leg proximate end 73 is pivotally connected to a respective spring retainer cap ear 82 by a lost motion coupling 84 comprising a pin 85 positioned in a respective elongated slot 83 for rotational and sliding movement therein. A front end 86 of the spring retainer cap 81 has attached thereto a knob or bump button 87. A rear end 88 of the spring retainer cap 81 is open to form a blind receiver 89.

A prestressed helical spring 91 is positioned between the spindle 55 and the spring retainer cap 81. Rear and front ends 92 and 93 respectively of the spring 91 are received in the spindle body front base end 59 and the spring retainer cap blind receiver 89 respectively. The helical spring 91 is preferably prestressed so that it biases the spring retainer cap 81 forwardly and exerts leverage across the fulcrums 77 whereby the lever feet 76 are biased rearwardly. It will be appreciated that the amount of rearward force exerted by the feet 76 is a function of the energy stored in the helical spring 91 and the relative placement of the lever proximate and distal ends 73 and 75 and the fulcrum 77 therebetween.

In operation, the saw blade 2 is placed against the upright 14 with its opening 6 in alignment with the support opening 38 and its rear face 8 in engagement with the spacer front edge 43. The spindle 55 is then inserted into the aligned openings 6 and 38 whereby its threaded shank 61 extends rearwardly past the spacer rear edge 45 and its frusto-conical portion 57 engages the saw blade opening 6 in a line contact therewith. A wing nut 94 is threadably received on the shank 61, engages the spacer rear edge 45 and functions as locking means to retain the spindle 55, the saw blade 2 and the upright 14 in close fitting respective engagement. However, the wing nut 94 should not be overtightened such as to preclude rotation of the saw blade 2 relative to the spindle 55 and the support 3.

The respective arrangements of the clamp 1 and the support 3 function to facilitate rotation of the saw blade 2 therebetween, because the interengagements are line contacts in relatively close proximity to the rotational axis of the saw blade 2. Specifically, the spindle body frusto-conical portion forms a line contact with the saw blade 2 at the intersection of its opening 6 and front face 7. The spacer front edge 43 also engages the saw blade rear face 8 in a line contact. Furthermore, the respective line contacts are preferably metal-to-metal whereby relatively little frictional resistance to rotation of the saw blade 2 is encountered. Hence, the clamp 1, the saw blade 2 and the upright 14 may be relatively securely interconnected while allowing the saw blade 2 to easily be rotated as required.

With the saw blade 2 thus mounted on the upright 14 by the spindle 55, the helical spring 91 acting through the spring retainer cap 81 and the levers 71 will force the feet pads 79 into braking engagement with the saw blade front face 7 whereby the saw blade 2 is securely clamped in a predetermined position whereat its cutting edges 5 are accessible for honing by, for example, a file or whet stone.

To rotate the saw blade 2 so that other teeth 4 and their cutting edges 5 are brought into position for sharpening, the operator merely pushes rearwardly on the knob or bump button 87 whereby the helical spring 91 is compressed and the feet pads 79 disengaged from the saw blade front face 7. With the pads 79 thus disengaged, the saw blade 2 is unclamped and may easily be rotated by hand to a position whereat the desired teeth 4 are convenienty accessible.

Although pushing the knob 87 rearwardly causes a corresponding force to be exerted through the spindle 55 pushing the blade 2 against the support 3, rotating the saw blade 1 is nevertheless relatively easy because the aforementioned line contacts are metal-to-metal and positioned relatively close to the rotational axis of the saw blade 2, whereas the operator will normally grasp the saw blade 2 at its peripheral teeth 4. Thus, the rotational force which the operator can manually exert has a substantial mechanical advantage over the frictional resistance to rotation resulting from pushing the knob 87.

The placement of the feet 76 at a relatively great distance from the saw blade rotational axis similarly creates a mechanical advantage to resist rotation of the saw blade 2 when the feet 76 are in clamping engagement therewith after the knob 87 is released.

Ease of operation is faciliated by employing a quick release mechanism such as that shown which is actuated by pressing rearwardly because the support 3 may be mounted in such a way that the knob 87 is accessible to the operator's knee. In this manner, the operator's hands are left free for rotating the saw blade 2 simultaneously with depressing the knob 87 and relatively little time is lost in saw blade repositioning in a normal sharpening operation. Thus, most of the time consumed in sharpening a saw blade can be spent on the actual honing process.

It is to be understood that while certain forms of the present invention have been illustrated and described herein, it is not to be limited to the specific forms or arrangement of parts described and shown.

What is claimed and desired to secure by Letters Patent is as follows:

1. A clamp for releasably securing a saw blade having a generally circular configuration with a central opening to a support having an opening, which comprises:
   (a) a lever having a distal end adapted for clamping said saw blade to said support and a proximate end;
   (b) lever mounting means comprising a spindle adapted for extending through said saw blade and support openings, said spindle being adapted for attachment to said support and pivotally connected to said lever at a fulcrum between said proximate and distal ends of said lever; and (c) biasing means connected to said lever proximate end and adapted for urging said lever proximate end away from said support and said lever distal end toward said blade;

(d) said lever proximate end being movable toward said blade whereby said lever distal end is disengaged therefrom.

2. The clamp according to claim 1 wherein:

(a) said biasing means comprises a spring attached to said spindle.

3. The clamp according to claim 2 which includes:

(a) a spring retainer receiving an outer end of said spring and pivotally connected to said lever proximate end.

4. The clamp according to claim 1 wherein said spindle includes:

(a) a body having a generally frusto-conical portion with a rear apex end and a front base end;

(b) a threaded shank extending rearwardly and coaxially from said spindle body apex end;

(c) an arm extending radially from said spindle body base end and having a distal end pivotally connected to said lever; and (d) a nut threadably engaging said threaded shank for drawing said spindle body against said saw blade in said opening thereof with said spindle extending through said saw blade and said support openings whereby said saw blade is retained against said support.

5. A clamp for releasably securing a saw blade with a central opening to a support, which comprises:

(a) a spindle including:
  (1) a body having front and rear ends and adapted for engaging said saw blade at said opening thereof;
  (2) a shank extending from said body rear end;

(b) locking means adapted for engagement with said shank and said support whereby said saw blade is rotatably retained by said spindle body against said support;

(c) a plurality of levers each having opposite proximate and distal ends, each said lever being pivotally attached to said spindle body at a fulcrum positioned between its respective proximate and distal ends;

(d) spring means engaging said shank body; and (e) spring retainer means connecting said lever proximate ends and said spring;

(f) said spring means being adapted for biasing said lever proximate ends forwardly away from said spindle body whereby said lever distal ends are biased rearwardly against said saw blade in clamping engagement with said support;

(g) said spring retainer means being movable rearwardly toward said spindle body whereby said lever distal ends are disengaged from said blade for rotating said blade relative to said support.

6. The clamp according to claim 5 wherein said support includes:

(a) an opening adapted to receive said spindle shank.

7. The clamp according to claim 6 wherein said support includes:

(a) an upright having a channel-shaped cross-sectional configuration with a pair of opposed, forwardly extending side flanges interconnected by a web;

(b) said support opening extending through said web.

8. The clamp according to claim 7 wherein said support includes:

(a) said web having opposite front and rear faces; and (b) a spacer annularly surrounding said support opening and extending forwardly from said support front face, said spacer terminating in a front edge positioned forwardly in spaced relation from said side flanges;

(c) said blade being adapted to bear on said spacer front edge and rotate relative to said support.

9. The clamp according to claim 7 wherein said support includes:

(a) a brace having an end plate attached to said upright and a base plate integrally connected to said end plate, said base plate being adapted for mounting on a base.

10. The clamp according to claim 9 which includes:

(a) said brace having a pair of spaced side walls each interconnecting said base plate and said end wall;

(b) said brace being adapted to receive an elongate member between said side walls.

11. The clamp according to claim 10 wherein:

(a) said brace is adapted for attachment to said upright in one of a position with said end plate and said side walls depending downwardly from said base plate in a position with said end plate and said side walls extending upwardly from said base plate.

12. The clamp according to claim 5 which includes:

(a) a plurality of lost motion linkages each at a connection between said spring retainer means and a respective lever proximate end.

13. The clamp according to claim 12 which includes:

(a) said spring retainer means comprising a spring retainer cap with a plurality of circumferentially spaced tabs extending radially outwardly therefrom;

(b) said lost motion linkages each comprising:
  (1) an elongated slot in one of each said spring retainer tab and said lever proximate end associated therewith; and
  (2) a pivot pin slidably and pivotally positioned in said elongated slot and attached to the other of said spring retainer tab and said lever proximate end associated therewith.

14. The clamp according to claim 5 which includes:

(a) said spindle having a plurality of arms extending radially from said spindle body and each terminating at a distal end;

(b) each said fulcrum of a respective lever being positioned at a respective arm distal end.

15. The clamp according to claim 14 wherein:

(a) said arms extend forwardly from said spindle body and said arm distal ends are postioned in spaced relation forwardly of a position of said blade clamped against said support.

16. The clamp according to claim 5 which includes:

(a) each said lever having a first leg terminating at a respective lever proximate end and a second leg terminating at a respective lever distal end, said legs being integrally connected in proximity to a respective fulcrum.

17. The clamp according to claim 16 which includes:

(a) each said lever first leg being angularly disposed relative to a lever second leg associated therewith;

(b) said lever first legs extending fowardly from said spindle body;

(c) said lever second legs extending rearwardly from said lever first legs.

18. The clamp according to claim 5 which includes:
(a) a plurality of anti-skid pads each mounted on a respective lever distal end and adapted for braking engagement with said blade.

19. A clamp for a saw blade with a central opening, which comprises:
(a) a support having front and rear faces and an opening extending therebetween;
(b) a spindle which comprises:
  (1) a body with an inner apex end, an outer base end and a frusto-conical portion positioned therebetween;
  (2) a threaded shank extending coaxially and rearwardly from said body apex end;
  (3) a plurality of arms extending radially from said spindle body base and each having a proximate end attached thereto and a distal end;
(c) a plurality of levers each associated with a respective arm and including:
  (1) a first leg having a proximate end;
  (2) a second leg integrally connected to said first leg and extending outwardly and rearwardly therefrom, said second leg having a distal end with a foot adapted for engaging said saw blade;
  (3) a fulcrum positioned in proximity to an interconnection between said first and second legs whereat said lever is pivotally connected to a respective arm distal end;
(d) a helical spring positioned coaxially with said spindle and having a rear end engaging said spindle body and a front end;
(e) a spring retainer receiving said spring front end, each said lever proximate end being pivotally connected to said spring retainer; and
(f) a nut threadably received on said spindle shaft, said nut being adapted for engaging said support rear face with said spindle extending through said saw blade and support openings whereby said spindle body frusto-conical portion engages said saw blade at said saw blade opening and said saw blade is rotatably retained against said support front face;
(g) said spring retainer being movable rearwardly toward said spindle body whereby said lever feet are disengaged from said saw blade for rotating said saw blade on said support;
(h) said spring being adapted for biasing said spring retainer forwardly away from said spindle whereby said lever feet are urged into engagment with said saw blade and said saw blade is clamped against rotation relative to said support.

* * * * *